Nov. 29, 1960

B. H. KLYCE 2,962,147

POSITION CONTROL SYSTEM

Filed Sept. 12, 1958

INVENTOR.
BATTLE H. KLYCE

BY
Brumbaugh, Free, Graves & Donohue his ATTORNEYS.

INVENTOR.
BATTLE H. KLYCE

United States Patent Office 2,962,147
Patented Nov. 29, 1960

2,962,147
POSITION CONTROL SYSTEM

Battle H. Klyce, Glenbrook, Conn., assignor to Time, Incorporated, New York, N.Y., a corporation of New York Filed Sept. 12, 1958, Ser. No. 760,706

14 Claims. (Cl. 192—142)

This invention relates to systems for positioning a driven member at a desired location and, more particularly, to a new and improved system accomplishing such positioning with maximum speed and efficiency.

In random access memory devices and the like wherein a large number of memory units are stored in an array and identified according to their position in the array, it is desirable to provide a drive system capable of moving a reading device from any storage position in the array to any other position in minimum time. Thus, such systems require apparatus for receiving a signal representing a desired location, comparing the signal with the actual location of the reading device, and controlling the drive system in response to the difference between these locations. Also, in memory devices wherein two sets of information can be stored in two places on a single memory unit as, for example, on opposite sides of a record card, the reading unit must be further positioned in response to an input signal to select information at the proper place on the memory unit for reproduction.

Accordingly, it is an object of this invention to provide a new and improved system for controlling the position of a driven member in response to an input signal with maximum speed and efficiency.

Another object of the invention is to provide a system of the above character capable of positioning a reading device at either of two positions with respect to each of an array of memory units.

These and other objects of the invention are attained by utilizing a commutator element having a group of segments arranged to represent each position in a series by the boundary between energized and unenergized segments. The entire group of segments on the commutator element is shiftable to move the series of positions between two locations corresponding to a pair of locations of the driven member at each position in the series. Commutator brushes movable with the driven member detect the segment potentials, actuating a drive system to connect a motion generator with the driven member in accordance with the potential at the brushes, and gating elements responsive to signals detected by the brushes condition the appropriate clutch and reversing elements to move the driven member to the desired position.

Further objects and advantages of the invention will be apparent from a reading of the following description in conjunction with the accompanying drawings in which.

Figure 1:
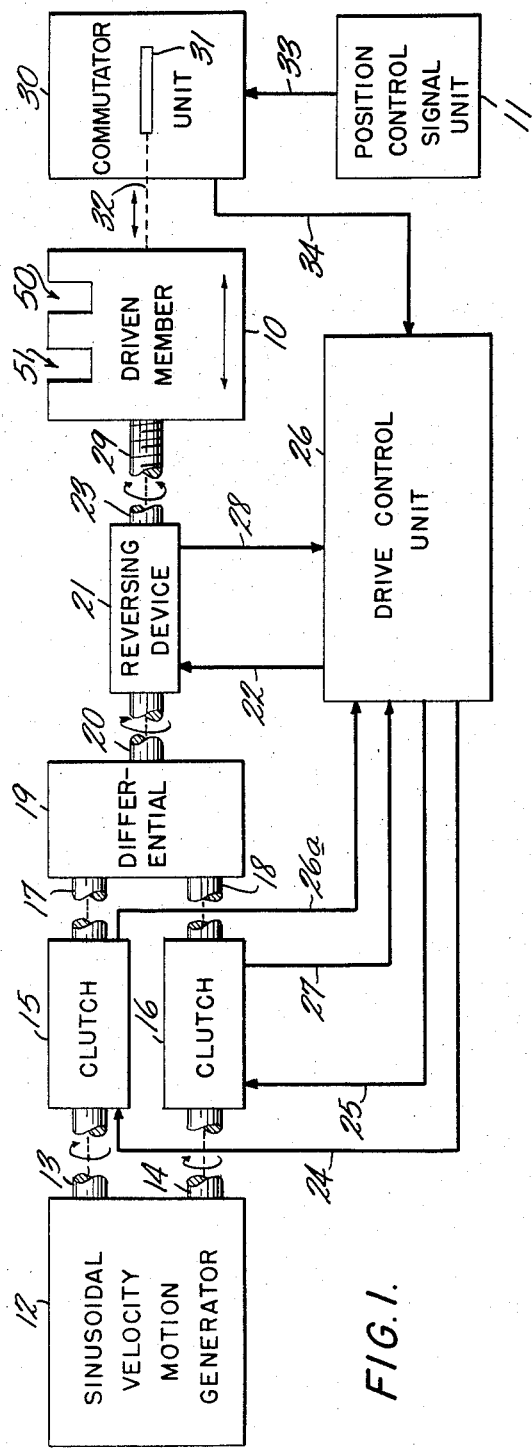
Fig. 1 is a block diagram illustrating schematically the arrangement of a typical position control system according to the invention.

As shown in Fig. 1, a typical position control system is arranged according to the invention to move a driven member 10 to any of a plurality of predetermined positions in respons to a signal from a position control unit 11 corresponding to the desired position. In a random access memory, for example, each of the various positions may correspond to one of a plurality of information storage units arranged in an array of columns and rows, the driven member 10 comprising a reading device which may be moved both horizontally and vertically to any of the positions in the array to reproduce information from a storage unit. For simplicity, only the drive mechanism for moving the driven member in one coordinate is illustrated in Fig. 1, it being understood that other similar drive systems may be utilized to move the unit in other coordinates. Furthermore, as described in greater detail hereafter, the driven member 10 may be moved similarly by two or more drive systems in each coordinate, these systems being arranged to provide coarse and fine position control, for example.

In the typical control system illustrated in Fig. 1, a conventional sinusoidal velocity motion generator 12, of the type disclosed in copending U.S. application Serial No. 652,175, filed April 11, 1957, is utilized to supply rotary motions through two output shafts 13 and 14 in 180° out-of-phase relation, both output motions varying in velocity from zero to the same maximum value at the same frequency. As described in the above-identified application, these output motions are connected through conventional definite position clutches 15 and 16 to the shafts 17 and 18 of a differential 19 so that the differential output shaft 20 rotates at a constant velocity when both the clutches 15 and 16 are engaged. In addition, a reversing device 21, connected to the output shaft 20 and actuated by energization of conductors in a cable 22, is arranged to provide rotary motion in the forward or revers direction at an output shaft 23 in response to rotation of its input shaft.

Each of the clutches 15 and 16, which may be of the type described in copending U.S. application Serial No. 729,642, filed April 21, 1958, or of the type disclosed in U.S. Patents Nos. 331,524, granted December 1, 1885, and 413,490, granted October 22, 1889, for example, is arranged to engage only at the zero velocity position of its input shaft whenever a corresponding input conductor 24 or 25 is energized. Also, each clutch is disengaged only at the next zero velocity position of its input shaft when the input conductor is deenergized. Inasmuch as the velocity variation of the shafts 13 and 14 is in out-of-phase relation, it will be apparent that simultaneous energization of both the clutches 15 and 16 accelerates the differential output shaft 20 to a constant rotational velocity in a smooth and efficient manner provided by the sinusoidal increase in velocity of the output shaft 13 or 14 which is first connected to the differential by the clutch 15 or 16. Furthermore, since each of the clutches 15 or 16 is disengageable only at a predetermined angular position of its input shaft, the drive system output shaft 23 can be moved to any of a series of definite angular positions by appropriate actuation of the clutches 15 and 16. As described in greater detail hereinafter, each of the lines 22, 24, and 25 is energized by a drive control unit 26, both the clutches 15 and 16 and the reversing device 21 also being connected to the drive control unit by cables 26a, 27, and 28, respectively, to provide electrical signals indicating the condition of actuation or deactuation of these elements.

Although the sinusoidal velocity drive system described above has many advantages and provides drive motion for the preferred embodiment of the invention, any system for transmitting motion in either direction to a shaft 23 in response to signals such as those applied to the conductors 22, 24, and 25 and capable of positioning the shaft at any of a series of definite positions, may be utilized with the invention.

Figure 2:
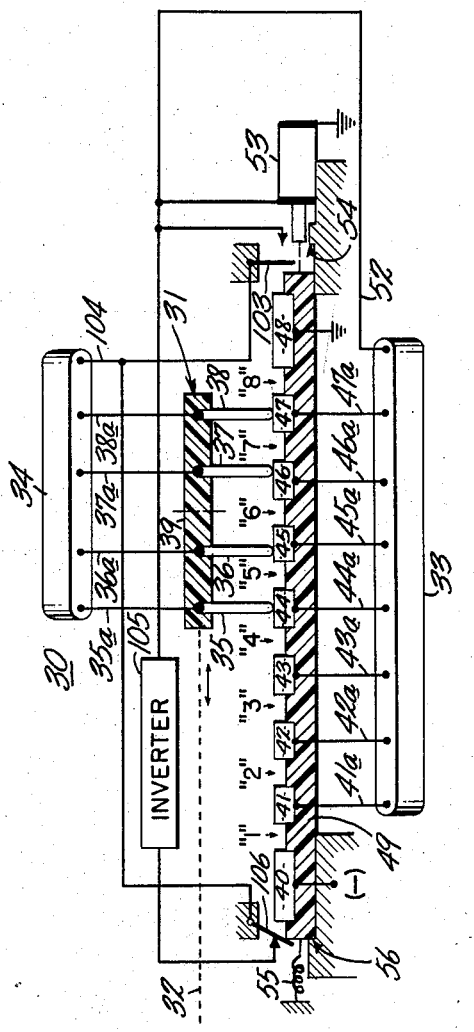
Fig. 2 is a schematic representation of a commutator unit arranged according to the invention.

In order to move the driven member 10 in either direction to any of a series of positions in a particular coordinate, as indicated in the drawing by the arrow, the drive system output shaft may be linked to a lead screw 29, for example, the connection between the two being arranged in any conventional manner so that the series of definite positions of the output shaft 23 corresponds to the series of positions to which the driven member 10 is to be moved. Mounted within a commutator unit 30, a brush member 31, described in greater detail hereinafter with respect to Fig. 2, is movable to any of a series of positions corresponding to those of the driven member by an appropriate mechanical connection 32 linking it with the driven member. The commutator unit receives electrical signals representing positions to which the driven member is to be moved through a cable 33 from the position control signal unit 11 and transmits signals indicating the relation between the desired position and the actual position of the driven member to the drive control unit 26 through a cable 34.

As best seen in Fig. 2, the commutator unit 30 comprises the brush member 31 having four brushes 35, 36, 37, and 38 mounted on an insulative support 39 and a plurality of conductive segments 40—48 fixed in spaced relation on an insulative mount 49. One end segment 40 of the series is connected to a negative voltage source and the other end segment 48 is grounded while the remaining segments 41—47 are connected to receive electrical signals through corresponding conductors 41a—47a of the cable 33. The boundaries between adjacent pairs of segments 40—48 are indicated in the drawing by reference numerals "1" through "8" and the center of the brush member 31 is aligned with one of these positions by the mechanical linkage 32 when the driven member 10 is at corresponding locations in its series of positions. At any position in these series, the inner brushes 36 and 37 of the brush member contact the commutator segments adjacent the position with which the center of the brush member is aligned, while the brushes 35 and 38 contact the next segment on either side, respectively.

Although only eight boundary positions are illustrated in the commutator shown in the drawing, it will be understood that the commutator can include any desired number of boundary positions by suitably increasing the number of segments. Furthermore, in memory systems having a large number of storage units, extremely rapid motion of the driven member from the position of any storage unit to that of any other storage unit can be accomplished by utilizing two or more drive systems in each coordinate. Thus, in the horizontal coordinate, for example, each row of storage units may be divided into a series of groups, one drive system with its commutator unit being arranged to move the driven member to the group of units which includes the desired position, while another drive position and commutator unit operate simultaneously to move the driven member to the required location within the group.

As described in greater detail hereinafter, the position control system responds to electrical signals applied to the commutator unit 30 by the position control signal unit 11 to move the driven member to a position at which the center of the brush member 31 coincides with the boundary between energized and unenergized segments of the group 40—48. Accordingly, the signal directing the driven member 10 to a selected position comprises negative energization of the portion of the conductors 41a—47a leading to segments below the commutator position corresponding to the desired position of the driven member and grounding of the conductors leading to segments on the other side of that commutator position. Thus, if the desired position of the driven member corresponds to the commutator position "6," for example, the conductors 41a—45a receive negative potential and the conductors 46a and 47a are held at ground by the signal unit. Although any conventional device for energizing the conductors in this manner, such as a multiposition manual switch, for example, may be utilized in the signal control unit 11, the signal unit employed in the preferred embodiment of the invention includes a binary translation matrix of the type described in copending U.S. application Serial No. 721,406, filed March 14, 1958, to convert binary code signals representing desired positions of the driven member into appropriate conductor energization patterns.

In certain random access memory systems, each of the storage units includes information recorded at two different places, for example, on opposite sides of the card or frame comprising the storage unit thus requiring different orientations of a transducer in the reading device in order to reproduce the information from the two places. Accordingly, the reading device must be arranged to accommodate any storage unit at either of two locations to read informaiton from either of the two places on the unit. As illustrated in Fig. 1, the driven member 10, which may be a reading device of this type, includes two slots 50 and 51 arranged so that information may be read from one side of a storage unit received in the slot 50 and from the other side of a unit located in the slot 51.

Inasmuch as each storage unit is customarily assigned only one positioning signal to cause the driven member to be moved into a predetermined relation with the storage unit, for example, to a position wherein the receiving slot 50 is aligned with the unit, an additional signal must be provided if the driven member is to receive the same storage unit in the other slot 51 for reproduction of information recorded on the other side of the unit. Furthermore, since the drive system is arranged with definite position clutches 15 and 16, which can stop the driven member only at one of a spaced series of predetermined positions, the two slots 50 and 51 must be spaced a distance equal to an integral number of these positions.

Accordingly, when a storage unit is to be received in the slot 51, the position control signal unit 11 applies a negative voltage shift signal to a conductor 52 in the cable 33. As best seen in Fig. 2, this signal energizes a solenoid 53 to move the commutator segment mount 49 to the right, as viewed in the drawings, against a stop 54, thereby shifting the series of segments 40—48 a distance corresponding to the spacing between the slots 50 and 51. In this manner, the entire series of positions represented by the boundaries between these segments is translated with respect to the storage units so that a position signal representing a particular storage unit causes the slot 51 to be aligned with aht unit rather than the slot 50. When the solenoid 53 is deenergized, a spring 55 restores the mount 49 to its normal position against a stop 56.

From an examination of Fig. 2, it will be seen that when the brush member 31 is at the positions required by the position control signal unit 11, the brushes 35 and 36 are negatively energized and the brushes 37 and 38 are grounded in accordance with the conductor energization pattern described above. If the brush member is one position to the left of the required position, the brushes 35, 36, and 37 will be negatively energized and, if farther to the left, all the brushes will be negative. Similarly, if the brush member 31 is one position to the right of the required position, the brushes 36, 37, and 38 will be grounded, while a position farther to the right will ground all the brushes. It will be understood that in each case the driven member 10 is at a corresponding location with respect to the desired position thereof.

Figure 3:
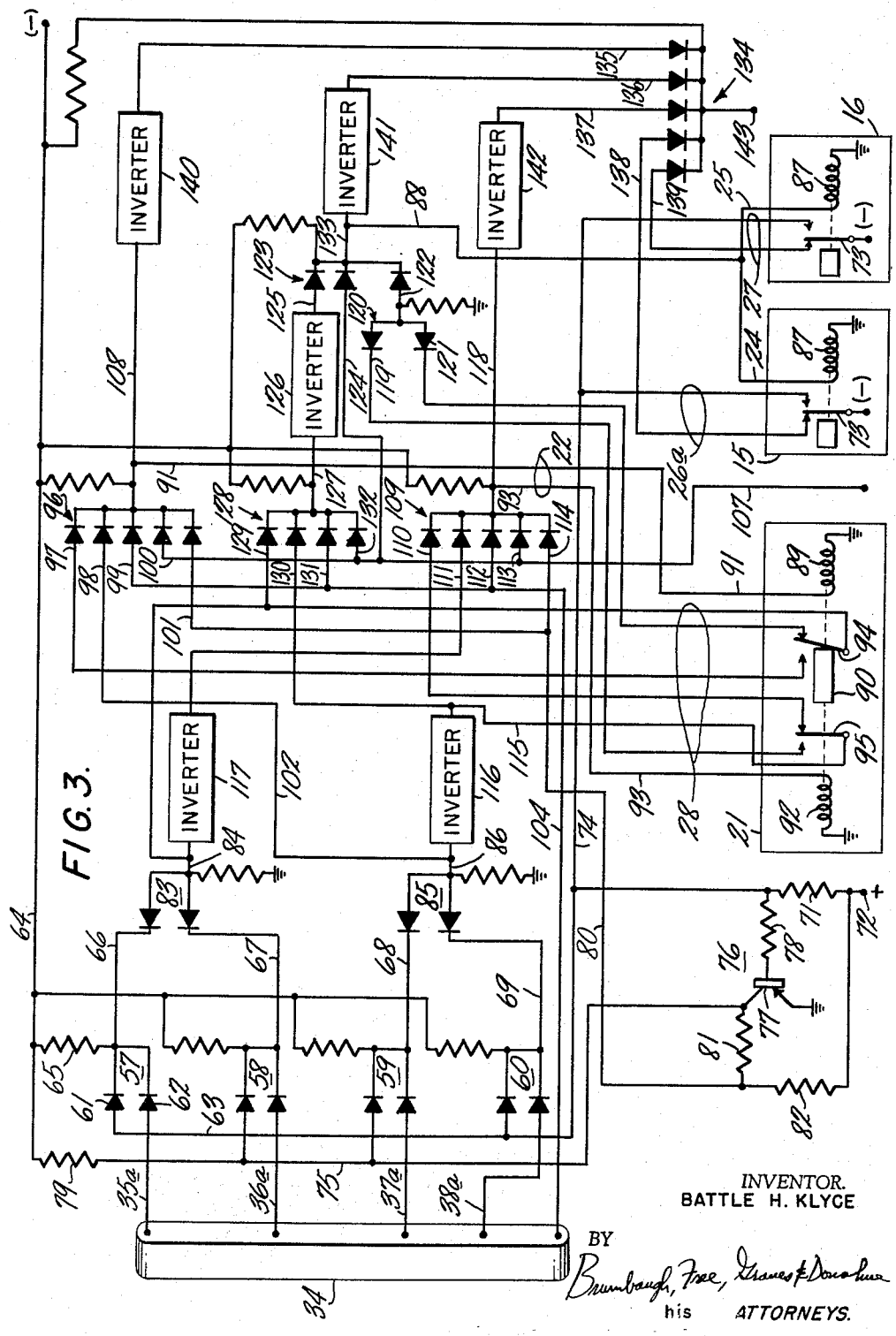
Fig. 3 is a schematic circuit diagram illustrating in detail the drive control unit of Fig. 1.

Each of the brushes 35, 36, 37, and 38 is connected through a corresponding conductor 35a, 36a, 37a, and 38a of the cable 34 to the drive control unit 26. As illustrated in Fig. 3, each of these conductors comprises an input to one of a group of dual input AND gates 57, 58, 59, and 60. These gates are all alike and are enerpreceding operations to be performed by other apparatus, such as the removal of a memory unit from the driven member, for example, have been completed and the driven member is ready to be moved. In order to make certain that no shifting takes place in the reversing device 21 while its input shaft is turning, the fifth input 101 to the gate 96 is energized negatively from the conductor 80 only when both clutches are disengaged, as described above. With all these inputs negatively energized, an output conductor 108 from the gate 96 becomes negative, energizing the winding 89 through the conductor 91 to actuate the reversing device 21 so that the driven member will be moved to the right when the clutches are engaged.

If both the conductors 84 and 86 are at ground potential, indicating that the driven member 10 must be moved to the left, and the shifting element 90 is in the right-hand position as shown in Fig. 3, another AND gate 109 having inputs 110, 111, 112, 113, and 114 is activated. The first input 110 of this gate is energized negatively through the normally closed contact of the switch 95 in the reversing device and a line 115, which is held negative by an inverter 116 whenever the conductor 86 is at ground potential. The second input 111 is held negative in a similar manner by an inverter 117 as long as the conductor 84 is grounded. As previously described, the conductor 104 is negative whenever the commutator unit has responded properly to a shifting signal and this energizes the input 112 to this gate, while the input 113 is connected to the ready line 107. With both the clutches 15 and 16 disengaged, the last input 114 receives negative potential from the conductor 80 in the manner described above. Under these conditions, therefore, an output line 118 from this gate is at a negative potential energizing the winding 92 through the line 93 to shift the reversing device 21 into condition to move the member 10 to the left.

With the reversing device 21 conditioned, as described above, to move the driven member 10 to the right, the switch 94 is transferred by the element 90, applying negative voltage from the line 84 through the normally open contact of the switch to one input 119 of an OR gate 120. On the other hand, if the reversing device 21 is conditioned to drive the member to the left, the switch 95 is transferred, impressing negative voltage from the inverter 116 through the conductor 115 of the normally open contact of the switch to another input 121 of the OR gate. In either case, an output line 122 comprising one input to an AND gate 123 becomes negative as soon as the reversing device is actuated. Another input 124 to this gate is connected to the ready line 107 described above.

A third input 125 to the gate 123 is negatively energized by an inverter 126 whenever the output 127 of an AND gate 128 is at ground potential, the gate 128 being arranged to generate a stop signal by opening when the driven member 10 has been moved to a point less than two positions away from the desired position. The first input 129 to this gate is connected to the line 84 while the second input 130 is joined to the output of the inverter 116. Accordingly, both these inputs will be negative only when the line 84 is negative and the line 86 is at ground potential. Another input 131 to this gate receives signals from the line 104 which is negative when the commutator unit 30 is in the proper position, as described above, while the fourth input 132 is connected to the ready line 107. Thus, until the lines 84 and 86 are at negative and ground potentials, respectively, the inverter 126 supplies negative voltage to the input 125 of the gate 123, negatively energizing its output line 133 which in turn energizes the clutch actuation conductors 88, 24, and 25. In this manner, the clutches 15 and 16 are conditioned ot transmit motion in the proper direction to the driven member 10 and, as described above, this takes place when the input shaft of each clutch reaches the next position of zero velocity.

In order to provide an output signal indicating that an operation has been completed, the drive control unit includes another AND gate 134 having five inputs 135, 136, 137, 138, and 139. Three of these inputs 135, 136, and 137, receive negative potential from the three inverters 140, 141, and 142 when the lines 108, 133, and 118, respectively, are at ground potential, indicating that no actuating signals are being transmitted to the clutches 15 and 16 and the reversing device 21. Inasmuch as the clutches 15 and 16 are arranged to release at a definite position and thus remain engaged for a portion of a cycle after the line 88 has been deenergized, the inputs 138 and 139 to the gate 134 are connected to the normally closed contacts of the switches 73 of the clutches 15 and 16, respectively, so that the gate 134 will not open until both clutches are disengaged.

In operation, with the clutches 15 and 16 disengaged, the inner brushes 36 and 37 of the commutator unit 26 control the operation of the drive system as a result of the negative condition of the conductor 75 and the ground potential of the conductor 63. Therefore, as soon as a signal is received from the position control signal unit 11 representing a position other than that at which the driven member is located, the energization pattern of the segments 40—48 is changed so that the boundary between the energized and unenergized segments does not coincide with the center of the brush member 31. Also, if a shift signal is received from the conductor 52, indicating that the driven member is to be moved to align the slot 51 rather than the slot 50 with a selected position, the segment support 49 is shifted to the right by actuation of the solenoid 53, thereby moving the boundary between the energized and unenergized segments so that the slot 51 will be at the desired position when the center of the brush member 31 is at this boundary.

In either case, the brushes 36 and 37 are no longer at negative and ground potentials, respectively, and, unless the shifting element 90 is already in the appropriate position, one of the gates 96 and 109 is activated in the manner described above to shift the reversing device 21, conditioning it to move the driven member in the proper direction. Application of negative voltage through the switch 94 or 95 when the reversing device 21 is in the proper position opens the gate 123, energizing the solenoid winding 87 of both the clutches 15 and 16. As previously mentioned, both these clutches are arranged to engage only when their input shafts are at a predetermined position, the clutch 15 engaging at the zero velocity position of the drive shaft 13 and the clutch 16 engaging at the zero velocity position of the drive shaft 14 when the shaft 13 is at its maximum velocity.

As soon as either of the clutches 15 and 16 engages, transmitting motion to the driven member 10, one of the switches 73 applies negative potential to the line 74. This energizes one input to the gates 57 and 60 in the manner described above so that the outer brushes 35 and 38 control the operation of the system and renders the inner brushes 36 and 37 inactive by applying ground potential from the inverter 76 through the conductor 75 to one input of the gates 58 and 59. It will be understood that since both the clutches 15 and 16 can disengage only at predetermined positions corresponding to the series of positions to which the driven member 10 is movable, the clutches must be conditioned to disengage by deenergization of the solenoid windings 87 when the driven member is between one and two positions away from the desired position.

Inasmuch as the outer brushes 35 and 38 each contact the second commutator segment away from the center of the brush member 31 when it is at any of the series of positions and these brushes control the operation of the drive control unit when either clutch is energized, the leading brush detects the boundary between energized gized in the usual manner to maintain an output at or near ground potential if either or both inputs are grounded and to drive the output to a negative potential if both inputs are negative. Thus, the gate 57, for example, includes two diode elements 61 and 62 receiving input signals from a line 63 and the conductor 35a, respectively. The common cathodes of the diode elements are joined to a negative conductor 64 through a resistor 65 and to an output line 66. As long as either input 35a or 63 is at ground, a circuit is completed from the negative conductor 64 through the resistor 65 and the corresponding diode element to ground, thereby holding the output conductor 66 at or near ground potential, the resistance of the resistor 65 being large with respect to that of the diodes 61 and 62 in their low resistance orientation. If both the inputs are negative, no current flows through the resistor 65 and the line 66 is held at a negative potential. In a similar manner, the potential of three other output conductors 67, 68, and 69 is controlled by the inputs of the gates 58, 59, and 60.

The conductor 63, which also provides the second input for the fourth AND gate 60, is normally held at ground potential by a voltage divider comprising the resistor 65 in the gates 57 and 60 and a resistor 71 joining the other end of the line to a positive source 72. Actuation of either of the clutches 15 and 16, however, transfers a switch 73 in the clutch from its normally closed to its normally open position, as indicated schematically in Fig. 3, connecting the negative voltage source to the conductor 63 through the cable 26a or 27 and a conductor 74. In this manner, the gates 57 and 60 are conditioned to receive signals from the outer brushes 35 and 38 through the conductors 35a and 38a whenever either of the clutches 15 and 16 is engaged, the inner gates 58 and 59 being activated, as described below, whenever both clutches are disengaged.

Negative energization of the conductor 74 also disables the gates 58 and 59 which receive signals from the inner brushes 36 and 37 through one input by application of ground potential to their second inputs through a conductor 75 from a voltage inverter 76. The voltage inverter 76 is arranged to hold the line 75 negative whenever the conductor 63 is at ground potential and hold the line 75 at ground potential when the conductor 63 is negative. As a typical example, the voltage inverter 76 may comprise a grounded emitter transistor 77 having its base electrode joined to the lines 63 and 74 through a resistor 78 and its collector electrode connected through a resistor 79 to the negative conductor 64 by way of the line 75. Another output line 80 is also connected to the collector electrode through a small resistor 81 and to the positive source 72 through a large resistor 82. Thus, the transistor 77 conducts, drawing current through the resistor 79 to hold the line 75 at ground potential and close the gates 58 and 59, when the line 74 applies negative voltage to its base electrode. The transistor is cut off when its base electrode is raised to ground potential by the conductor 63, making the line 75 negative to activate the gates 58 and 59. If desired, the other voltage inverter units referred to hereinafter may be constructed in a similar manner.

Output signals from the gates 57 and 58 are applied to a conventional OR gate 83 so that an output conductor 84 therefrom is negative whenever either input is negative, while output signals from the gates 59 and 60 are received by a similar OR gate 85 to actuate its output conductor 86. Inasmuch as the gates 57 and 58 receive signals from the brushes 35 and 36 on one side of center of the brush member 31 while the gates 59 and 60 are operated in response to signals from the brushes of the other side of center of the brush member, it will be apparent that when the brush member 31 is at the desired position the conductor 84 is negative and the conductor 86 is at ground potential. Therefore, when this condition occurs, the motion generator 12 must be disengaged from the driven member 10. Also, if both the conductors 84 and 86 are negative, the driven member is to the left of the required position, as viewed in the drawings, and the drive control unit must actuate the system to move into the right. On the other hand, if both these conductors are at or near ground potential, the driven member is too far to the right and must be moved to the left.

To this end, each of the clutches 15 and 16 is provided with an actuating solenoid winding 87, as indicated schematically in Fig. 3, arranged to be energized through the connecting lines 24 and 25, respectively, conditioning the clutches 15 and 16 to engage at the next zero velocity position of their input shafts whenever a control unit conductor 88 is at a negative potential. Also, the reversing device 21 includes a solenoid winding 89 for actuating a mechanical shifting element, schematically illustrated in Fig. 3 by the block 90, when energized through a conductor 91 of the cable 22 so that the output shaft 23 (Fig. 1) turns in a direction to move the driven member 10 to the right. Another solenoid winding 92 energized through a line 93 shifts the element 90 so that the member 10 is driven to the left, as viewed in the drawings. After the winding 89 or 92 has been deenergized, the shifting element 90 is retained by any well-known means, such as an over-center spring in the position to which it has been shifted until the other winding 89 or 92 is energized to shift it in the opposite direction. When the element 90 is shifted to the right, as illustrated in Fig. 3, by energization of the winding 89, it transfers a switch 94 from the normally closed to the normally open position, another switch 95 being similarly operated when the winding 92 moves the shifting element to the left as viewed in Fig. 3.

In order to energize the line 91 to drive the member 10 to the right, if the shifting element 90 is not already in its right-hand position, an AND gate 96 having five inputs 97, 98, 99, 100, and 101 must be opened by negatively energizing all the inputs simultaneously. Whenever the output line 84 of the gate 83 is negative, the input 97 will be negatively energized through the normally closed contact of the switch 94. If the output of the switch gate 85 is also negative, indicating that the member 10 must be moved to the right, the input 98 will be held negative through a conductor 102. Referring to Fig. 2, a negative shift signal from the conductor 52 is transmitted through a normally open switch 103 and a conductor 104 of the cable 34, which is connected to the input 99, if the commutator support 49 is in its right-hand position. If the commutator support is in its left-hand position, as shown, the ground potential of the unenergized conductor 52 produces a negative output from a voltage inverter 105, which may be similar to the inverter 76 described above. This negative signal is carried through a normally open switch 106 and the conductor 104 to the input 99 when the commutator is in its left-hand position, the switch 106 being held closed by the commutator support 49.

Therefore, as long as the commutator support 49 is in either of its extreme positions in accordance with a signal from the line 52, the conductor 104 and the input 99 receive negative voltage. During the time when the commutator is shifting from one position to the other, both the switches 103 and 106 are open so that no signal is applied to this conductor. Furthermore, if the line 52 is negative and the commutator is not shifted, the line 104 will be held at ground. Similarly, if the line 52 is grounded and the commutator has not been restored to its normal position, the line 104 will be grounded. In this manner, no operation can take place unless the commutator unit 30 has responded properly to the shift signal from the position control signal unit 11.

The fourth input 100 to the gate 96 is connected to a conductor 107 through which a negative ready signal can be applied to the control system, indicating that any and unenergized segments when the driven member is between one and two positions from the desired position. When this occurs, the conductors 84 and 86 receive negative and ground potentials, respectively, closing both the gates 96 and 109 and causing the gate 128 to open. As mentioned above, opening of the gate 128 provides a stop signal by grounding the input 125 to close the gate 123, thereby deeergizing the clutch solenoid windings 87.

Although the clutch solenoid windings are deenergized, each clutch remains engaged until its input shaft reaches its next zero velocity position, corresponding to one of the series of positions of the driven member 10. Thus, when the driven member reaches a position one position away from the desired position, one of the clutches is at its next zero velocity position and disengages. Thereafter, with only one clutch engaged, the driven member is decelerated sinusoidally, stopping at the desired position when this clutch disengages, since the next position of zero velocity of this clutch corresponds to the desired position of the driven member. If the energization pattern of the commutator segments indicates that only a one-position motion is necessary to move the driven member to the desired position, the clutch solenoid windings 87 are deenergized as soon as control is transferred from the inner brushes 36 and 37 to the outer brushes 35 and 38 by actuation of one of the clutches. Therefore, only one of the clutches engages and this clutch is actuated for only one cycle of its input shaft so that the driven member 10 moves only one position.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. Apparatus for controlling the position of a member adapted to be driven to any of a series of positions by a motion generator comprising commutator means including a plurality of electrically conductive segments separated by boundaries corresponding to the series of positions and arranged to provide differing electrical potentials to segments located on opposite sides of the boundary corresponding to a desired position of the member, brush means movable with the member for detecting the potentials of segments separated by the boundary corresponding to the position of the member, connecting means actuable to transmit motion from the motion generator to the member to drive it in either direction with respect to the series of positions, and gate means responsive to the potentials detected by the brush means to actuate the connecting means so that the member is driven toward the desired position.

2. Apparatus for controlling the position of a member adapted to be driven to any of a series of positions by a motion generator comprising commutator means including a plurality of electrically conductive segments separated by boundaries corresponding to the series of positions and arranged to provide differing electrical potentials to segments located on opposite sides of the boundary corresponding to a desired position of the member, brush means movable with the member for detecting the potentials of segments separated by the boundary corresponding to the position of the member, connecting means actuable to transmit motion from the motion generator to the member to drive it in either direction with respect to the series of positions, first gate means responsive to the potentials detected by the brush means to actuate the connecting means so that the member is driven toward the desired position, and second gate means responsive to detection of the boundary corresponding to the desired position of the member by the brush means to deactuate the connecting means.

3. Apparatus for controlling the position of a member adapted to be driven by a motion generator to any of a series of positions and aligned in one of at least two locations with respect to any position comprising commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means movable with the member for detecting the potentials of segments separated by the boundary corresponding to the position of the member with respect to one location, connecting means actuable to transmit motion from the motion generator to the member to drive it in either direction with respect to the series of positions, and gate means responsive to the potentials detected by the brush means to actuate the connecting means so that the member is driven toward the desired position.

4. Apparatus for controlling the position of a member adapted to be driven by a motion generator to any of a series of positions and aligned in one of at least two locations with respect to any position comprising commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means movable with the member for detecting the potentials of segments separated by the boundary corresponding to the position of the member with respect to one location, connecting means actuable to transmit motion from the motion generator to the member to drive it in either direction with respect to the series of positions, first gate means responsive to the potentials detected by the brush means to actuate the connecting means so that the member is driven toward the desired position, and second gate means responsive to detection of the boundary corresponding to the desired position of the member by the brush means to deactuate the connecting means.

5. Apparatus for controlling the position of a member adapted to be driven to any of a series of positions by a motion generator comprising commutator means including a plurality of electrically conductive segments separated by boundaries corresponding to the series of positions and arranged to provide differing electrical potentials to segments located on opposite sides of the boundary corresponding to a desired position of the member, brush means including a pair of brushes movable with the member for detecting the potentials of segments separated by the boundary corresponding to the position of the member, connecting means actuable to transmit motion from the motion generator to the member to drive it in either direction with respect to the series of positions, first gate means responsive to similar potentials at one level detected by the pair of brushes to actuate the connecting means so that the member is driven in one direction, second gate means responsive to similar potentials at a second level detected by the pair of brushes to actuate the connecting means so that the member is driven in the opposite direction, and third gate means responsive to a difference in the potentials detected by the pair of brushes to deactuate the connecting means.

6. Apparatus for controlling the position of a member adapted to be driven to any of a series of positions by a motion generator comprising commutator means including a plurality of electrically conductive segments separated by boundaries corresponding to the series of positions and arranged to provide differing electrical potentials to segments located on opposite sides of the boundary corresponding to a desired position of the member, brush means movable with the member for detecting the potentials of segments separated by the boundary corresponding to the position of the member, connecting means for transmitting motion from the motion generator to the member including definite position clutch means arranged to disengage only at positions corresponding to the series of positions of the member and reversing means actuable to transmit motion to the member to drive it in either direction with respect to the series of positions, first gate means responsive to the potentials detected by the brush means to actuate the reversing means to drive the member in the proper direction, and second gate means responsive to actuation of the reversing means to actuate the clutch means.

7. Apparatus for controlling the position of a member adapted to be driven to any of a series of positions by a motion generator comprising connecting means actuable to transmit motion to the member to drive it in either direction with respect to the series of positions including definite position clutch means arranged to disengage only at positions corresponding to the series of positions of the member, commutator means including a plurality of electrically conductive segments separated by boundaries corresponding to the series of positions and arranged to provide differing electrical potentials to segments located on opposite sides of the boundary corresponding to a desired position of the member, brush means movable with the member including an inner pair of brushes arranged to detect the potentials of the two segments adjacent the boundary corresponding to the position of the member and an outer pair of brushes arranged to detect the potentials of the next segment on each side of the boundary, first gate means responsive to the potentials detected by the inner pair of brushes to actuate the connecting means to drive the member toward the desired position, and second gate means responsive to a potential difference detected by the outer pair of brushes to deactuate the connecting means.

8. Apparatus for controlling the position of a member adapted to be driven to any of a series of positions by a motion generator comprising connecting means including definite position clutch means arranged to disengage only at positions corresponding to the series of positions of the member and reversing means actuable to transmit motion to the member to drive it in either direction with respect to the series of positions, commutator means including a plurality of electrically conductive segments separated by boundaries corresponding to the series of positions and arranged to provide differing electrical potentials to segments located on opposite sides of the boundary corresponding to a desired position of the member, brush means movable with the member including an inner pair of brushes arranged to detect the potentials of the two segments adjacent the boundary corresponding to the position of the member and an outer pair of brushes arranged to detect the potentials of the next segment on each side of the boundary, first gate means responsive to potentials detected by the inner pair of brushes to actuate the reversing means to drive the member toward the desired position, second gate means responsive to actuation of the reversing means to actuate the clutch means, and third gate means responsive to a potential difference detected by the outer pair of brushes to deactuate the clutch means.

9. Apparatus according to claim 8 including gate means responsive to engagement of the clutch means to disable the inner pair of brushes and condition the outer pair of brushes to detect segment potentials and responsive to disengagement of the clutch means to disable the outer pair of brushes and condition the inner pair of brushes to detect segment potentials.

10. Apparatus for controlling the position of a member adapted to be driven by a motion generator to any of a series of positions and aligned in one of at least two locations with respect to any position comprising connecting means actuable to transmit motion from the motion generator to the member to drive it in either direction with respect to the series of positions including definite position clutch means arranged to disengage only at positions corresponding to the series of positions of the member, commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means including a pair of brushes movable with the member for detecting the potentials of segments separated by the boundary corresponding to the position of the member with respect to one location, and gate means responsive to the potentials detected by the brush means to actuate the connecting means so that the member is driven toward the desired position.

11. Apparatus for controlling the position of a member adapted to be driven by a motion generator to any of a series of positions and aligned in one of at least two locations with respect to any position comprising connecting means including definite position clutch means arranged to disengage only at positions corresponding to the series of positions of the member and reversing means actuable to transmit motion to the member to drive it in either direction with respect to the series of positions, commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means including a pair of brushes movable with the member for detecting the potentials of segments separated by the boundary corresponding to the position of the member with respect to one location, first gate means responsive to similar potentials at one level detected by the pair of brushes to actuate the connecting means so that the member is driven in one direction, second gate means responsive to similar potentials at a second level detected by the pair of brushes to actuate the connecting means so that the member is driven in the opposite direction, and third gate means responsive to a difference in the potentials detected by the pair of brushes to deactuate the connecting means.

12. Apparatus for controlling the position of a member adapted to be driven by a motion generator to any of a series of positions and aligned in one of at least two locations with respect to any position comprising connecting means including definite position clutch means arranged to disengage only at positions corresponding to the series of positions of the member and reversing means actuable to transmit motion to the member to drive it in either direction with respect to the series of positions, commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means movable with the member including an inner pair of brushes arranged to detect the potentials of the two segments adjacent the boundary corresponding to the position of the member and an outer pair of brushes arranged to detect the potentials of the next segment on each side of the boundary, first gate means responsive to the potentials detected by the inner pair of brushes to actuate the connecting means to drive the member toward the desired position, and second gate means responsive to a potential difference detected by the outer pair of brushes to deactuate the connecting means.

13. Apparatus for controlling the position of a member adapted to be driven by a motion generator to any of a series of positions and aligned in one of at least two locations with respect to any position comprising connecting means including definite position clutch means arranged to disengage only at positions corresponding to the series of positions of the member and reversing means actuable to transmit motion to the member to drive it in either direction with respect to the series of positions, commutator means including a plurality of electrically conductive segments separated by boundaries normally corresponding to a first location of the member with respect to the series of positions, the commutator means being arranged to provide differing electrical potentials to segments located on opposite sides of the boundary corresponding to a desired position of the member, shift means for moving the plurality of electrically conductive segments so that the boundaries correspond to a second location of the member with respect to the series of positions, brush means movable with the member including an inner pair of brushes arranged to detect the potentials of the two segments adjacent the boundary corresponding to the position of the member and an outer pair of brushes arranged to detect the potentials of the next segment on each side of the boundary, first gate means responsive to potentials detected by the inner pair of brushes to actuate the reversing means to drive the member toward the desired position, second gate means responsive to actuation of the reversing means to actuate the clutch means, and third gate means responsive to a potential difference detected by the outer pair of brushes to deactuate the clutch means.

14. Apparatus according to claim 13 including gate means responsive to engagement of the clutch means to disable the inner pair of brushes and condition the outer pair of brushes to detect segment potentials and responsive to disengagement of the clutch means to disable the outer pair of brushes and condition the inner pair of brushes to detect segment potentials.

References Cited in the file of this patent

UNITED STATES PATENTS

| | | |
|---|---|---|
| 2,575,792 | Bullard et al. | Nov. 20, 1951 |
| 2,853,900 | Hillyer | Sept. 30, 1958 |
| 2,854,114 | Hillyer et al. | Sept. 30, 1958 |